United States Patent [19]

Schmidt et al.

[11] Patent Number: 5,139,993
[45] Date of Patent: Aug. 18, 1992

[54] METHOD OF IMPROVING THE THERMAL SHOCK BEHAVIOR OF MONOLITHIC CATALYSTS

[75] Inventors: Felix Schmidt; Bernd Mergner, both of Rheinfelden; Rainer Domesle, Alzenau-Kälberau, all of Fed. Rep. of Germany

[73] Assignee: Degussa Aktiengesellschaft, Frankfurt am Main, Fed. Rep. of Germany

[21] Appl. No.: 658,476

[22] Filed: Jan. 31, 1991

[30] Foreign Application Priority Data

Mar. 1, 1990 [DE] Fed. Rep. of Germany ....... 4006346

[51] Int. Cl.$^5$ .......................... B01J 23/56; B01J 35/04
[52] U.S. Cl. .................................... 502/325; 502/439; 502/527
[58] Field of Search ........................ 502/439, 527, 325

[56] References Cited

U.S. PATENT DOCUMENTS

| | | | |
|---|---|---|---|
| 4,451,517 | 5/1984 | Inoguchi et al. | 502/527 X |
| 4,483,940 | 11/1984 | Ono et al. | 502/159 |
| 4,532,228 | 7/1985 | Golino et al. | 502/439 X |

FOREIGN PATENT DOCUMENTS 0149912  5/1989  European Pat. Off. .

*Primary Examiner*—W. J. Shine
*Attorney, Agent, or Firm*—Beveridge, DeGrandi & Weilacher

[57] ABSTRACT

The thermal shock resistance of monolithic catalysts is improved by pre-coating a ceramic monolithic carrier, before the application of catalytic components, with an organic filling material which can be melted and burned out and which comprises a dispersion of very fine solid particles, by heating the carrier above the melting point of the filling material, then applying the catalytic components and then burning out the filling material.

11 Claims, No Drawings

METHOD OF IMPROVING THE THERMAL SHOCK BEHAVIOR OF MONOLITHIC CATALYSTS

INTRODUCTION TO THE INVENTION

The present invention relates to a method of producing monolithic catalysts, with improved thermal shock qualities, from an inert ceramic monolithic carrier, a film of catalyst-promoting metal oxide on the carrier and from noble and/or base metals distributed in the film as catalytically active component. In particular, the thermal shock behavior of catalysts with monolithic carriers comprising cordierite or mullite should be improved.

Ceramic carrier material naturally contains microcracks which act under a shock-like thermal load (e.g. rapid heating and cooling) as expansion joints and can impart a certain thermoelasticity to the ceramic material.

It has been found that this elasticity decreases if the ceramic carrier is coated with an aqueous dispersion containing active metal oxide, e.g. γ-aluminum oxide, and promoters such as cerium, zirconium, iron, lanthanum and nickel in salt form and/or oxide form. The thermal shock behavior becomes worse and a destructive formation of cracks occurs even at a slight temperature stressing in the carrier and in the finished catalyst containing the catalytically active component, e.g. platinum-group metals. This was traced to the penetration of dissolved and/or very fine corpuscular substances into the microcracks.

It has also been assumed that the substances embedded in the microcracks close the expansion joints and take the thermoelasticity away from the ceramic material, thus worsening the thermal shock behavior in this manner. In addition, it could not be excluded that the substances remaining in the microcracks contribute too a further weakening of the carrier material on account of different coefficients of thermal expansion.

U.S. Pat. No. 4,483,940 describes a preliminary coating of monolithic carriers with water-soluble polymers, which plug the microcracks and are intended to prevent the penetration of substances when the catalytic composition is applied. These polymeric substances have the disadvantage that they are dissolved out by aqueous oxide dispersions and, as a consequence, can influence the latter in a disadvantageous manner.

EP 0,149,912 describes a method of producing a coated ceramic honeycomb structure containing microcracks in which the microcracks are filled in the honeycomb structure with a material which is burnt away at a temperature below the sintering temperature of the applied coating. The method includes, among other things, the following steps:

a) Impregnation with a molten organic compound, insoluble in water, which is solid at room temperature and is essentially non-volatile;

b) The compound used for impregnation is allowed to become solid by cooling off;

c) Application of an immersion coating optionally containing catalytic substance; and d) Burning out of the substance introduced by means of impregnation as well as impregnation with catalytically active material to the extent it is not yet contained in the immersion coating.

The known method in its form described above is relevant here because it impregnates the carrier body in a melt of the filling agent. The carrier must be freed of excess liquid filling agent before the cooling for solidification of the filling agent, a process which meets with considerable problems especially on a commercial scale. A carrier surface results from this process which is entirely coated with the hydrophobic filling substance on which carrier surface a metal oxide film formed from an aqueous dispersion can not be satisfactorily deposited and adhered without a previous carbonization of the filling and coating substance. However, a carbonization is not disclosed in said patent for the embodiment relevant to the present invention.

It was found that a considerably simpler and more reliable sealing of the microcracks, which does not adversely affect the adhesion of an oxide film to be deposited from an aqueous dispersion, can be achieved by means of the "melting in" of filling agents which can be melted and burned out and are applied on the carrier as very fine solid particles (e.g. higher hydrocarbons, especially paraffin wax or polymers such as polyethylene wax). These substances fill the microcracks completely when they are melted on account of the capillary effect and remain during the coating process (e.g. with aqueous γ-aluminum oxide dispersions, which optionally contains promoter salts and/or promoter oxides) in the microcracks without adversely influencing the coating process.

After the conclusion of the coating process, the structure is dried and the filling material used is burnt out. The temporary "sealing" of the microcracks with an agent which can be melted, burned out and is insoluble in water, if executed in accordance with the present invention, results in a distinct improvement of the thermal shock behavior of the finished catalysts. Any suitable natural or synthetic hydrocarbon wax can be used for purposes of this invention, especially those having a melting point at 80° C. or above and capable of being burned out in air at 500° C. or above without adversely affecting the catalytic properties.

SUMMARY OF THE INVENTION

An object of the invention is to provide a method of producing monolithic catalysts, with improved thermal shock qualities, formed from an inert ceramic monolithic carrier, a film of catalysis-promoting metal oxide deposited on the carrier and noble and/or base metals distributed in the film as catalytically active component.

A feature of the invention is to add an organic filling agent which can be melted, burned out and is insoluble in water into the carrier before the application of metal oxide film and catalytically active component. The organic filling agent is first prepared as a finely divided, highly dispersed dispersion in an aqueous system and is impregnated into the carrier. The temporary sealing of the microcracks is achieved by heating at temperatures above the filling agent's melting point. The carrier is then cooled down below this melting point. The catalysis-promoting metal oxide film, which optionally contains the catalytically active component, is then applied onto the carrier by means of dispersion coating techniques. Following that, the structure is dried, and the filling agent is burned out in air at temperatures above 500° C. If not previously added, the catalytically active component is then applied in a known manner onto the metal oxide film.

DETAILED DESCRIPTION OF THE INVENTION

The method is characterized in that the carrier is pre-coated at room temperature with particles of the organic filling agent by means of a treatment with an aqueous dispersion of the filling agent, preferably of a paraffinic wax with a melting point above 80° C. The carrier pre-coated in this manner is dried and subsequently heated above the melting point of the filling agent. In general, 10-90 minutes, preferably 15-60 minutes, suffice for heating of the carrier pre-coated with very fine particles of the filling agent (after a careful drying). The temperature is preferably 30-70° C. above the melting point of the filling agent.

It is advantageous if the organic filling agent to be applied is emulsified in water at an elevated temperature (e.g., about 125° C.) in the presence of an emulsifier and under the action of high shearing forces and if the emulsion is then converted, by means of being cooled to room temperature, into the dispersion of very finely divided solid material to be used. Possible emulsifiers are cetyltrimethylammoniumbromide, fatty alcohol polyglycol ethers, or nonylphenyl polyglycol ethers. High shearing forces (e.g., 15,300 sec$^{-1}$) can be provided by a conventional apparatus (e.g., Ultra Turrax from the German firm Janke & Kunkel).

The carrier impregnated with the organic filling material dispersion can be coated, after carrying out the melting and cooling process, in a conventional manner with aluminum oxide optionally containing promoter substances, and dried. Promoters may be one or more of the oxides of Ce, Zr, Fe, La or of other rare earth metals. The filling material can be burned out and the catalytically active component, e.g. a composition containing platinum-group metal elements, can be applied. However, the platinum group metal component can previously be introduced in the aluminum oxide coating as is known in the art. Untreated carriers and carriers "sealed" in accordance with the present invention; i.e. sealed with filling material before applying metal oxide film; exhibit no differences in the adhesion of the finished metal oxide coating. An untreated carrier is not treated by the inventive procedure and is dispersion coated (i.e., it is a naked carrier).

In the following examples, monolithic cordierite carriers from the same production, with the dimensions 93×76 mm, with 46.5 cells/cm$^2$ and 0.17 mm. wall thickness, were used.

EXAMPLES

Comparative example 1

Three carriers without pretreatment using organic filling agent were coated with an aqueous dispersion containing:

| | |
|---|---|
| 72% by weight Al$_2$O$_3$ | (as solid) |
| 20% by weight CeO$_2$ | (as salt) |
| 5% by weight ZrO$_2$ | (as salt) |
| 3% by weight Fe$_2$O$_3$ | (as salt). |

The carriers were dried at 150° C. and tempered by heating for 4 hours at 700° C.

The oxide coating obtained was impregnated with 0.2 g per carrier unit of platinum and rhodium in a ratio of 5:1, dried at 150° C., and tempered at 600° C. in forming gas (5% by volume H$_2$, 95% by volume N$_2$).

Comparative example 2

Three carriers were immersed in an aqueous 5% by weight solution of "MOVIOL" (a water soluble polyvinyl alcohol with a molecular weight of 23,000; sold by Hoechst, 4-98 type), the excess solution blown out, and the carriers subsequently dried 1 hour in a flow of air at 120° C. Then the carriers were coated with a dispersion in the same way as in comparative example 1. The oxide coating obtained was impregnated with 0.2 g per carrier unit of platinum and rhodium in a ratio of 5:1, dried at 150° C., and tempered by heating at 600° C. in forming gas (5% by volume H$_2$, 95% by volume N$_2$).

EXAMPLE 1

Three carriers were immersed at room temperature in an aqueous dispersion prepared from an aqueous emulsion of 1.5% by weight of a commercially available, straight-chain paraffin wax with a melting point of 110° C. with the emulsifier Lamacit APG (ethoxyated monoglyceride; Grunau, Illertissen, Germany) at temperatures around 125° C. under pressure and shearing agitation. The impregnated carriers were blown out with air, dried and treated one hour in a flow of air at 150° C. The carriers were then coated with the dispersion identified in comparative example 1 in the same way.

The oxide coating obtained was impregnated with 0.2 g per carrier unit of platinum and rhodium in a ratio of 5:1, dried at 150° C., and tempered at 600° C. in forming gas (5% by volume H$_2$, 95% by volume N$_2$).

EXAMPLE 2

The adhesion strengths of the coatings obtained in comparative examples 1 and 2 and in example 1 were determined by means of weighing before and after a 3-minute blowing off of the coated carrier units with air at a super pressure of 6 bars. The following amounts of coating were blown off (on the average):

| | Weight loss in g |
|---|---|
| Comparative Example 1 | 0.17 |
| Comparative Example 2 | 0.60 |
| Example 1 | 0.20 |

Measurement of the thermal shock resistance began with the carriers being placed in a furnace for 30 minutes at 750° C. After removal from the furnace, the carriers were allowed to stand 30 minutes in air at room temperature. This cycle was repeated three times for each carrier unit with a gradual increasing of the furnace temperature by 25° C. each time. The temperature at which visible cracks appear is defined as the failure (defect) temperature of the particular carriers used:

| | Failure temperature (°C.) |
|---|---|
| Comparative example 1 | <750 |
| Comparative example 2 | 775 |
| Example 1 | 825 |
| Carrier not treated by the inventive procedure and is not dispersion coated | >900 |

EXAMPLE 3

Three mullite carriers with the dimensions 15×15×15 cm, with a cell density of 16 cells/cm$^2$ and a cell wall thickness of 0.5 mm, were each coated without and with the pretreatment of the present invention (in the latter instance according to example 1) with an aqueous dispersion composed of 80% by weight γ-Al$_2$O$_3$ (as solid), 17% by weight CeO$_2$ (as nitrate) and 3% by weight ZrO (as carbonate), dried at 150° C., and tempered 4 hours at 600° C. The oxide coating thus obtained was impregnated with 5.3 g per carrier unit of platinum and rhodium in a ratio of 5:1, dried at 150° C., and tempered at 600° C. in forming gas (5% by volume H$_2$, 95% by volume N$_2$).

The pretreatment with the organic filling agent took place in accordance with example 1. The coatings displayed no difference in adhesion between the pretreated and the non-pretreated specimens. The finished catalysts were placed directly into a furnace heated to 380° C., left there for 1 hour, then removed and cooled down in air. The carriers were tested for cracks by tapping with 400 g hammer. Cracks produce a rattling sound, even if they are not visible from the outside.

All pretreated parts were free of objections. Two of the non-pretreated parts had non-visible but "audible cracks". The carriers had been unobjectionable during tapping prior to the coating.

Further variations and modifications of the invention will become apparent to those skilled in the art from the foregoing and are intended to be encompassed by the claims appended hereto.

What is claimed:

1. A method of producing monolithic catalysts with improved thermal shock qualities, wherein said monolithic catalysts comprise an inert ceramic monolithic carrier, a film of catalyst-promoting metal oxide on said carrier, and noble and/or base metals distributed in said film as catalytically active component, said method comprising:
    (a) pre-coating carrier with an aqueous dispersion of particles of an organic filling agent which is insoluble in water,
    (b) drying said pre-coated carrier,
    (c) heating said pre-coated carrier to a temperature above the melting point of said filling agent so as to melt in said filling agent without adversely affecting the adhesion of the subsequently applied metal oxide onto said carrier,
    (d) cooling said carrier to a temperature below said melting point,
    (e) applying a metal oxide film, which optionally contains a catalytically active component, by means of dispersion coating,
    (f) drying said carrier,
    (g) burning out said filling agent in air, and
    (h) applying the catalytically active component onto said metal oxide film if not performed in step (e).

2. The method according to claim 1, wherein said filling agent is a higher hydrocarbon.

3. The method according to claim 2, wherein said higher hydrocarbon is a paraffinic wax with a melting point above 80° C.

4. The method according to claim 2, wherein said higher hydrocarbon is polyethylene wax.

5. The method according to claim 1, wherein said heating in step (c) is conducted for 10-90 minutes.

6. The method according to claim 5, wherein said heating in step (c) is conducted for 15-60 minutes.

7. The method according to claim 1, wherein said heating in step (c) is conducted at a temperature 30-70° C. above the melting point of said filling agent.

8. The method according to claim 1, wherein said aqueous dispersion of said filling agent in step (a) is emulsified in water at an elevated temperature in the presence of an emulsifier and under the action of high shearing forces and subsequently cooled to room temperature.

9. The method according to claim 8, wherein said emulsifier is ethoxyated monoglyceride.

10. The method according to claim 1, wherein said burning out in step (g) is conducted in air at temperatures above 500° C.

11. The method according to claim 7, wherein said filling agent is a straight-chain paraffin wax with a melting point of 110° C.

* * * * *